United States Patent
Fraser et al.

(10) Patent No.: US 7,968,048 B2
(45) Date of Patent: Jun. 28, 2011

(54) COMPOSITE SPARGER

(75) Inventors: Kevin S. Fraser, Mississauga (CA); Murray Scott Pearson, Oakville (CA)

(73) Assignee: Hatch Ltd., Mississauga, Ontario (CA)

( * ) Notice: Subject to any disclaimer, the term of this patent is extended or adjusted under 35 U.S.C. 154(b) by 814 days.

(21) Appl. No.: 11/661,910

(22) PCT Filed: Sep. 1, 2004

(86) PCT No.: PCT/CA2004/001610
§ 371 (c)(1),
(2), (4) Date: Feb. 5, 2008

(87) PCT Pub. No.: WO2006/024128
PCT Pub. Date: Mar. 9, 2006

(65) Prior Publication Data
US 2008/0292043 A1    Nov. 27, 2008

(51) Int. Cl.
*C21B 7/16* (2006.01)
*C21C 5/48* (2006.01)

(52) U.S. Cl. ........ 266/270; 266/216; 266/217; 266/218; 266/224; 266/225; 266/226; 266/265

(58) Field of Classification Search .......... 266/216–218, 266/224–226, 265, 270
See application file for complete search history.

(56) References Cited

U.S. PATENT DOCUMENTS

| | | | |
|---|---|---|---|
| 3,849,587 A | | 11/1974 | Hatch et al. |
| 4,023,676 A | * | 5/1977 | Bennett et al. ............... 266/222 |
| 4,687,053 A | | 8/1987 | Paulus et al. |
| 4,898,368 A | * | 2/1990 | Schaffer et al. ............. 266/222 |

FOREIGN PATENT DOCUMENTS

| | | |
|---|---|---|
| CA | 2236145 | 10/1998 |
| CA | 2401223 | 8/2001 |
| CA | 2462114 | 2/2004 |
| EP | 0 135 144 A1 | 3/1985 |
| JP | 58-199855 * | 11/1983 |
| WO | WO 01/03823 A1 | 1/2001 |
| WO | WO 01/17915 A1 | 3/2001 |
| WO | WO 01/43872 A1 | 6/2001 |

OTHER PUBLICATIONS

International Search Report for PCT CA/2004/001610.
Written Opinion of the International Searching Authority.
Supplementary European Search Report for Application No. EP 04 76 1774.

* cited by examiner

*Primary Examiner* — Roy King
*Assistant Examiner* — Lois Zheng
(74) *Attorney, Agent, or Firm* — McCarter & English, LLP

(57) ABSTRACT

A composite sparger for use in elevated temperature and corrosive environments. The composite sparger is formed from a thermally conductive non-combustible metal substrate. The surfaces of the conductive non-combustible metal exposed to the reactor environment are protected with a corrosion resistant layer. The corrosion resistant layer protects the substrate material from the corrosive environment of the reactor vessel and the substrate material conducts heat away from the corrosion resistant layer to prevent combustion of the corrosion resistant layer. The substrate material and corrosion resistant material may be selected so as to provide for sufficient thermal conduction to prevent combustion of the corrosion resistant material.

18 Claims, 2 Drawing Sheets

COMPOSITE SPARGER

FIELD OF THE INVENTION

The present invention relates to spargers and, in particular, spargers for use in reactor vessels for corrosive high temperature processes.

BACKGROUND OF THE INVENTION

Hydrometallurgical processes to extract metal values from ore, such as pressure oxidation and pressure oxidative leaching, take place in specialized reactor vessels, such as an autoclave. Pressure oxidation in an autoclave typically requires the introduction and dispersion of oxygen gas through a sparger. Existing spargers typically include a J-shaped lance extending downwards into the vessel, through the vapour zone and into slurry in the vessel. The lower end of the lance is often curved in a J-shape so as to disperse oxygen below agitators located in the slurry. A flanged joint known as a fire break is located near the top of the vessel to prevent fire propagation through the vessel nozzle.

A difficulty with providing for oxygen sparging is that the environment within the vessel is highly corrosive. To avoid combustion of the sparger, the sparger is typically constructed of duplex and super-duplex stainless steel alloys or austentic stainless steel. Unfortunately, existing spargers have a short service life owing to the fact that the material used to create the sparger is subject to corrosion in the environment of the reactor vessel.

Corrosion resistant materials, such as reactive metals like titanium or niobium, are unsuitable for use creating an oxygen sparger since they are highly pyrophoric. Accordingly, use of these materials, while addressing the issue of corrosion, creates a risk of fire.

There does not appear to be a material that is both suitably corrosion resistant and non-combustible. Accordingly, there remains a need for a sparger capable of operating under elevated temperature and corrosive conditions.

SUMMARY OF THE INVENTION

The present invention provides a composite sparger for use in elevated temperature and corrosive environments. The composite sparger is formed from a thermally conductive non-combustible metal substrate. The surfaces of the thermally conductive non-combustible metal exposed to the reactor environment are protected with a corrosion resistant metal layer. The corrosion resistant layer protects the substrate material from the corrosive environment of the reactor vessel and the substrate material conducts heat away from the corrosion resistant layer to prevent combustion of the corrosion resistant layer. The substrate material and corrosion resistant material may be selected so as to provide for sufficient thermal conduction to prevent combustion of the corrosion resistant layer.

In one aspect, the present invention provides a sparger for use in a process within a reactor vessel having an inlet nozzle. The sparger includes a tube having a first end for fluid communication with the reactor vessel and a second end for coupling to a reagent supply, wherein the tube is formed from a thermally conductive substrate metal and a corrosion resistant layer on a surface of the substrate, the corrosion resistant layer having an ignition temperature. The sparger also has a flange connected to and extending outwardly from the tube for sealing the sparger to the inlet nozzle. The thermally conductive metal has thermal conductive properties sufficient to maintain the corrosion resistant layer below its ignition temperature.

In another aspect the present invention provides a sparger for injecting a reagent into a reactor vessel through an inlet nozzle, the reactor vessel being employed in a process. The sparger includes a thermally conductive metal pipe and a corrosion resistant layer on a surface of the pipe, the corrosion resistant layer being applied on the surface to prevent the thermally conductive metal pipe from exposure to the reagent and the process. The thermally conductive metal pipe conducts heat away from the corrosion resistant layer to prevent combustion of the corrosion resistant layer.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The following description of one or more specific embodiments of the invention does not limit the implementation of the invention to oxygen spargers. Other gases or liquids may be used as reactive oxidants, including hydrazine, ozone, hydrogen peroxide, ammonia, or other suitable oxidants. It will also be understood that the invention is not limited to spargers for oxidants and may be embodied in spargers used to disperse other reagents, including, for example, hydrogen or hydrogen sulfide.

Figure 1:
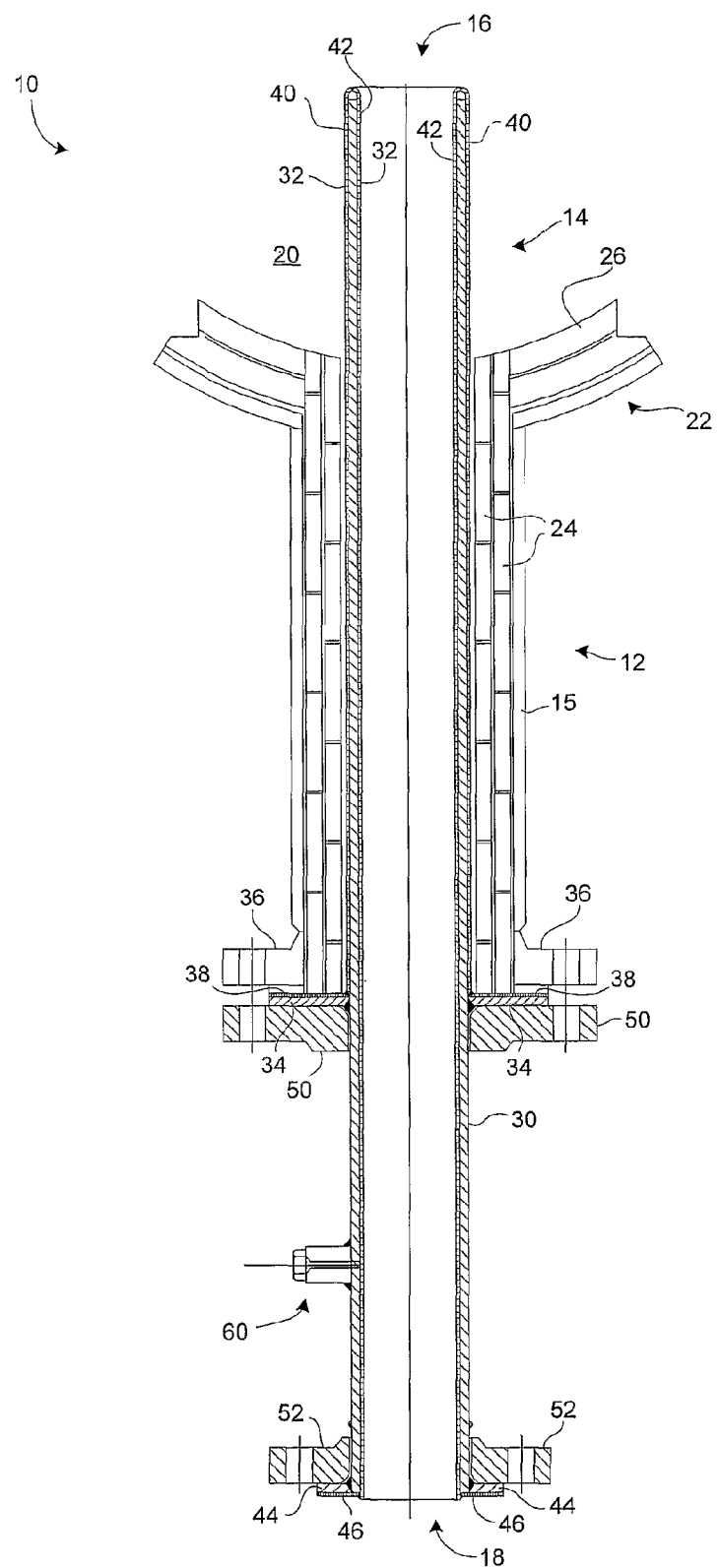
FIG. 1 shows a cross-sectional view of a sparger inserted into a reactor vessel through a reactor vessel inlet nozzle.

Reference is first made to FIG. 1, which shows a cross-sectional view of a sparger 10 inserted into a reactor vessel through a reactor vessel inlet nozzle 12. The sparger 10 includes a tube 14 for delivering a reagent, such as oxygen, from a reagent supply (not shown) to the interior 20 of the reactor vessel through the reactor vessel inlet nozzle 12. The tube 14 includes an outlet end 16 disposed within the interior 20 of the reactor vessel and an inlet end 18 disposed outside the reactor vessel inlet nozzle 12.

The reactor vessel includes a reactor vessel wall 22 having an interior refractory brick lining 26. The interior 20 of the vessel is in fluid communication with the reactor vessel inlet nozzle 12, which is formed from an outwardly extending pipe 15 having a refractory brick lining 24. It will be appreciated that in some embodiments the reactor vessel and the reactor vessel nozzle 12 need not have a refractory brick lining 26 or 24, respectively.

During a hydrometallurgical process, at least a portion of the interior 20 of the reactor vessel contains a process fluid, which may be referred to as slurry. The interior 20 of the reactor vessel may include a vapour zone above the slurry. In some embodiments, the slurry may include acids, alkali solutions, halides, and other aggressive and corrosive media.

The tube 14 is formed from a substrate tube 30 having at least a part of its surface lined with a corrosion resistant layer 32. The corrosion resistant layer 32 comprises a thin lining or cladding constructed from a corrosion resistant material. In particular, surfaces of the substrate tube 30 that may be exposed to the process fluid are protected by the corrosion resistant layer 32. Accordingly, the layer 32 includes exterior lining 40 and interior lining 42. The interior lining 42 extends the entire interior length of the substrate tube 30. The exterior lining 40 is joined with the interior lining 42 at the outlet end 16 of the tube 14 and extends along the exterior surface of the substrate tube 30 at least as far as the end of the reactor vessel inlet nozzle 12.

The end of the reactor vessel inlet nozzle 12 features a mounting flange 36. The sparger 10 includes a nozzle lap ring 34 formed from the same or similar material as the substrate tube 30. The nozzle lap ring 34 includes a face protected by a clad ring 38. The clad ring 38 may be applied to the nozzle lap ring 34 using an explosion welding (EXW) process. The clad ring 38, exterior lining 40, and interior lining 42 are all composed from the same or similar corrosion resistant material, which differs from the substrate material. The clad ring 38 is applied to the face of the nozzle lap ring 34 towards the mounting flange 36. The clad ring 38 may be machined to provide for a gasket seat in order to seal the sparger 10 to the mounting flange 36. A first flange backing ring 50 may be bolted to the mounting flange 36 to secure the sparger 10 to the reactor vessel inlet nozzle 12 and seal the clad ring 38 against the mounting flange 36.

The inlet end 18 of the sparger tube 14 includes a second lap ring 44 composed from the same or similar materials as the substrate tube 30. The outer face of the second lap ring 44 is provided with a clad ring 46 composed from the same or similar material as the corrosion resistant layer 32. A second flange backing ring 52 is provided to couple the sparger 10 to a reagent supply line.

Figure 2A:
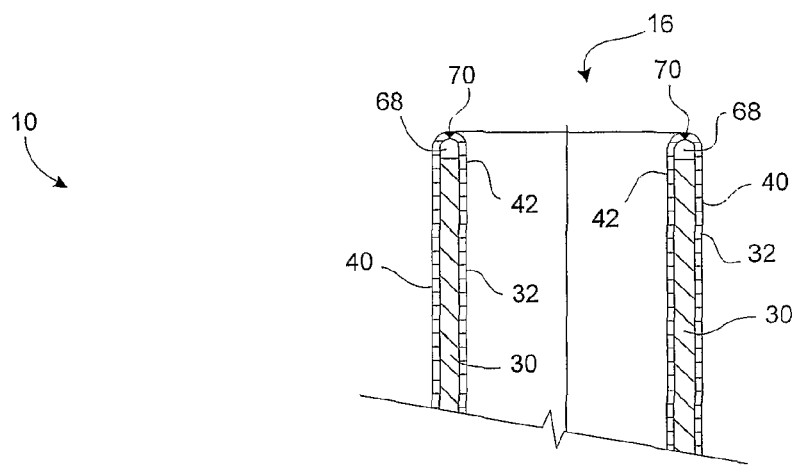
FIGS. 2 (*a*), (*b*), and (*c*) show enlarged portions of the cross-sectional view of the sparger shown in FIG. 1.

Reference is now made to FIG. 2(a), (b), and (c), which each show enlarged portions of the cross-sectional view of the sparger 10 shown in FIG. 1. FIG. 2(a) shows that the interior lining 42 and the exterior lining 40 are joined with a seal weld 70 at the outlet end 16. The corrosion resistant layer 32 may be applied around the substrate tube 30 as two concentric sleeves with a loose or sliding fit to accommodate differential thermal expansion between the linings 40, 42 and the substrate tube 30. Accordingly, an expansion gap 68 may be provided between the welded ends of the interior lining 42 and exterior lining 40 and the end of the substrate tube 30.

Figure 2B:
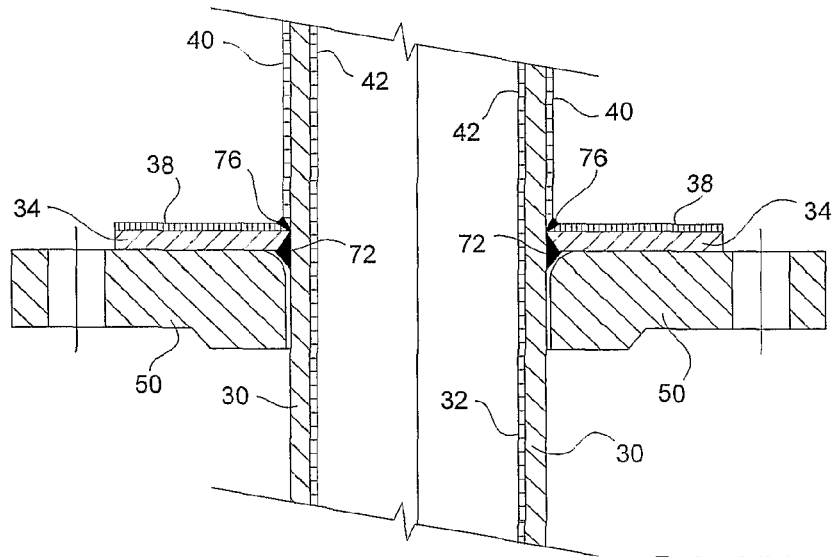

FIG. 2(b) shows the clad ring 38 joined to the exterior lining 40 by a seal weld 76 to prevent process fluid from reaching the substrate material in the substrate tube 30 or the nozzle lap ring 34.

FIGS. 2(b) and (c) show the lap rings 34 and 44 joined to the substrate tube 30 by way of strength welds 72 and 74, respectively. The strength welds 72 and 74 are created in accordance with applicable codes and standard welding practices.

Figure 2C:
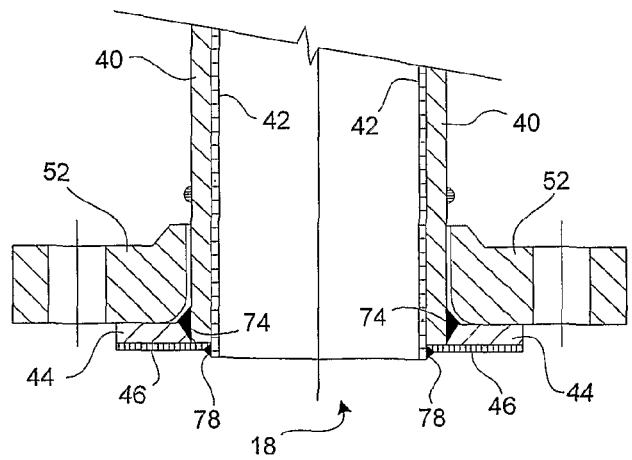

FIG. 2(c) shows the clad ring 46 joined to the interior lining 42 at the inlet end 18 of the sparger 10 by way of a seal weld 78.

The corrosion resistant layer 32 is therefore continuous from the face of the nozzle lap ring 34, up the exterior of the substrate tube 30, over into the interior of the substrate tube 30 and down its full interior surface, and terminating at the outer periphery of the second lap ring 44. The corrosion resistant layer 32 is thus the only material of the sparger 10 in direct contact with the process fluid in the reactor vessel. The substrate tube 30 and lap rings 34 and 44 are protected from the process fluid by the corrosion resistant layer 32. The corrosion resistant layer 32 may be applied in a relatively thin layer.

The backing rings 50, 52 are not exposed to any process fluid and may be formed from any material suitable for pressure boundary service. In one embodiment, the backing rings 50, 52 are formed from carbon steel.

It will be understood that bonding processes other than explosion welding may be used to bond the clad rings 38, 46 to the lap rings 34, 44.

The sparger 10 may be provided with a leak detection port 60 for determining if process fluid has managed to penetrate the corrosion resistant layer 32.

The corrosion resistant layer 32 is formed from a reactive metal, such as, for example, niobium, zirconium, titanium, tantalum, and other reactive metals or alloys thereof. The corrosion resistant material is thus a material having a high degree of corrosion resistance. It will be appreciated that such materials also have a significant degree of pyrophoricity.

The substrate tube 30 and lap rings 34, 44 are formed from a material having high thermal inertia and a low burn ratio, as explained further below.

The applicants have noted that the substrate material serves to conduct heat away from a potential ignition site in the corrosion resistant material. Accordingly, the substrate is protected from the corrosive effects of the process fluid by the corrosion resistant material and the substrate material prevents ignition of the corrosion resistant material due to the thermal properties of the substrate. In the circumstances wherein a burning promoter material, such as sulfur, ignites at the surface of the corrosion resistant layer 32, the substrate material may conduct heat away from the combustion site preventing propagation of the combustion.

The substrate material is selected such that it has thermal properties sufficient to conduct heat at a rate adequate to maintain the corrosion resistant layer below the ignition threshold of the corrosion resistant material, even in presence of burning promoter material. With substrate material having sufficient thermal conductivity, the sparger 10 becomes self-extinguishing, allowing safe use of the sparger 10 in enriched oxygen service environments.

The substrate material has the physical properties of conductivity k, density $\rho$, and specific heat capacity $c_p$. The product of these three properties gives the thermal inertia of the substrate material. The higher the value of the thermal inertia, the more resistant a material is to ignition or combustion.

A burn ratio may also be defined for the substrate material. The burn ratio comprises the ratio between heat evolved during oxidation to heat required to melt an equivalent amount of material.

The substrate material having appropriate thermal conductive properties may be selected on the basis of the thermal inertia and burn ratio of the material. In one embodiment, the substrate material is selected such that it has a thermal inertia $\geq 15$ $(J/cm^2 \cdot K)^2 \cdot s$ and a burn ratio $\leq 2.0$. The applicants have noted that suitable substrate materials that meet these criteria include the following alloy families: coppers (with a designated minimum copper content of 99.3% and are considered essentially unalloyed copper), high-copper alloys (alloys having 94-99.3% copper content), brasses (in particular, copper-zinc brasses), bronzes, copper-nickel alloys (alloys that contain nickel as the principal alloying element and can include the Alloy 400 series of oxygen-compatible alloys), and copper-nickel-zinc alloys (commonly termed "nickel silvers"), as well as other special or copper-containing alloys. Such materials also provide reasonably good strength, elasticity, formability, and weldability. In one embodiment, the substrate material used is Alloy 400, which is a nickel-copper alloy identified under the Unified Numbering system as number NO4400.

The corrosion resistant material may be selected on the basis of its high electrochemical nobility. Certain corrosion resistant materials form a tenacious metal oxide that, once formed, inhibits further corrosion of the material. Appropriate corrosion resistant material includes reactive metals, including in some embodiments niobium, zirconium, and titanium.

In one embodiment, the cladding material is formed from tantalum or a tantalum alloy. Tantalum and tantalum alloys provide resistance to both oxidizing and reducing acids, such as $H_2SO_4$ and HCl and have electrochemical resistance to stress induced chloride cracking, pitting, and crevice corrosion in the presence of halides. In other embodiments, the corrosion resistant material may include stainless steel, austentic stainless steel, duplex stainless steel, super-duplex stainless steel, nickel-chromium-molybdenum alloy, or nickel-molybdenum alloys of the "B" and "C" nickel alloy family.

The minimum thickness of the substrate tube 30 may be determined from classical stress analysis, such that the primary membrane stress (circumferential or hoop stress) is less than 70% of the yield stress of the selected substrate material or the allowable working stress permitted by Code for the selected substrate material. The minimum required thickness of the lap rings 34, 44 may be determined from classical stress analysis or finite element method (FEM) such that the primary membrane plus bending stress is less than the yield stress of the selected material, or 1.5 times the allowable working stress permitted by Code for the selected material. The minimum required weld reinforcement size, as measured across the throat of the fillet, may be determined by classical stress analysis or FEM such that the primary membrane, plus bending, plus localised secondary stresses do not exceed the ultimate tensile stress of the selected material or three times the allowable working stress permitted by Code for the selected material.

The minimum thickness of the corrosion resistant layer 32 is determined by corrosion testing and/or fabrication and welding experience with the selected corrosion resistant material. The maximum thickness of the corrosion resistant layer may be determined by either classical one-dimensional, transient thermal diffusion calculations in cylindrical coordinates or by transient FEM. The maximum corrosion resistant layer thickness may be calculated such that the rate of heat transfer to the substrate material is greater than the net heat generated by combustion of the corrosion resistant material, and the localised surface temperature of the corrosion resistant material at a hypothetical combustion site is less than the ignition temperature of the corrosion resistant material. Material availability and practical constraints may determine the selected corrosion resistant layer thickness, provided it falls between these maximum and minimum limits.

Although the foregoing figures and description depict an embodiment wherein the sparger is inserted through a nozzle in the underside of a reactor vessel directly into the process fluid or slurry, it will be appreciated that the sparger may be inserted through a nozzle in the side, top or other portion of the vessel and may be placed in either the liquid or vapour zone of the vessel.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A sparger for use in a process within a reactor vessel having an inlet nozzle, the sparger comprising:
   a tube having a first end for fluid communication with the reactor vessel and a second end for coupling to a reagent supply, wherein the tube is formed from a thermally conductive substrate metal and a corrosion resistant layer on a surface of the substrate, said corrosion resistant layer having an ignition temperature; and
   a flange connected to and extending outwardly from said tube for sealing said sparger to said inlet nozzle,
   wherein
      said thermally conductive metal forms a pipe having an interior surface and an exterior surface disposed within the reactor vessel or the inlet nozzle and has thermal conductive properties sufficient to maintain said corrosion resistant layer below its ignition temperature; and
      said corrosion resistant layer covers said interior surface and said exterior surface disposed within the reactor vessel or the inlet nozzle and is formed from concentric linings at said interior surface and said exterior surface joined with a seal weld at said first end; and
      said concentric linings defines an expansion gap between said concentric linings and said thermally conductive metal at said first end.

2. The sparger claimed in claim 1, wherein said thermally conductive metal is selected from materials having a thermal inertia greater than 15 $(J/cm^2 \cdot K)^2 \cdot s$.

3. The sparger claimed in claim 1, wherein said thermally conductive metal is selected from materials having a burn ratio less than 2.0.

4. The sparger claimed in claim 1, wherein said thermally conductive metal comprises a material selected from the list consisting of copper, a copper alloy, copper-zinc brasses, bronzes, copper-nickel alloys, or copper-nickel-zinc alloys.

5. The sparger claimed in claim 1, wherein said corrosion resistant layer is formed from a reactive metal.

6. The sparger claimed in claim 5, wherein said reactive metal is selected from the group consisting of niobium, tantalum, zirconium, titanium, niobium alloy, tantalum alloy, zirconium alloy, and titanium alloy.

7. The sparger claimed in claim 1, wherein said corrosion resistant layer is formed from a metal selected from the group consisting of stainless steel, austentic stainless steel, duplex stainless steel, super-duplex stainless steel, nickel-chromium-molybdenum alloy, and nickel-molybdenum alloys of the "B" and "C" nickel alloy family.

8. The sparger claimed in claim 1, said corrosion resistant layer having a thickness, wherein said thickness is selected to provide a rate of heat transfer to the thermally conductive metal greater than the net heat generated by combustion of the corrosion resistant layer.

9. The sparger claimed in claim 1, further comprising means for coupling said flange to the inlet nozzle.

10. A sparger for injecting a reagent into a reactor vessel through an inlet nozzle, the reactor vessel being employed in a process, the sparger comprising:
    a thermally conductive metal pipe; and
    a corrosion resistant layer on a surface of said pipe, said corrosion resistant layer being applied on said surface to prevent said thermally conductive metal pipe from exposure to the reagent and the process, wherein said thermally conductive metal pipe defines an interior surface and an exterior surface disposed within the reactor vessel or the inlet nozzle and conducts heat away from said corrosion resistant layer to prevent combustion of said corrosion resistant layer;

said corrosion resistant layer is disposed upon said interior surface and said exterior surface located within the reactor vessel or the inlet nozzle and is formed from concentric linings joined with a seal weld at an end of said thermally conductive metal pipe; and said concentric linings defines an expansion gap between said seal weld and said end.

11. The sparger claimed in claim 10, wherein said thermally conductive metal pipe is formed from a material having a thermal inertia greater than 15 $(J/cm^2 \cdot K)^2 \cdot S$.

12. The sparger claimed in claim 10, wherein said thermally conductive metal pipe is formed from a material having a burn ratio less than 2.0.

13. The sparger claimed in claim 10, wherein said thermally conductive metal pipe comprises a material selected from the list consisting of copper, a copper alloy, copper-zinc brasses, bronzes, copper-nickel alloys, or copper-nickel-zinc alloys.

14. The sparger claimed in claim 10, wherein said corrosion resistant layer is formed from a reactive metal.

15. The sparger claimed in claim 14, wherein said reactive metal is selected from the group consisting of niobium, tantalum, zirconium, titanium, niobium alloy, tantalum alloy, zirconium alloy, and titanium alloy.

16. The sparger claimed in claim 10, wherein said corrosion resistant layer is formed from a metal selected from the group consisting of stainless steel, austentic stainless steel, duplex stainless steel, super-duplex stainless steel, nickel-chromium-molybdenum alloy, and nickel-molybdenum alloys of the "B" and "C" nickel alloy family.

17. The sparger claimed in claim 10, said corrosion resistant layer having a thickness, wherein said thickness is selected to provide a rate of heat transfer to the thermally conductive metal pipe greater than the net heat generated by combustion of said corrosion resistant layer.

18. The sparger claimed in claim 10, further comprising means for coupling said thermally conductive metal pipe and said corrosion resistant layer to the inlet nozzle.

\* \* \* \* \*